:::: {}
United States Patent Office 3,486,911
Patented Dec. 30, 1969

---

3,486,911
TEXTILE TREATING COMPOSITIONS AND TEXTILES TREATED THEREWITH
Herman B. Goldstein, Cranston, R.I., assignor to Sun Chemical Corporation, New York, N.Y., a corporation of Delaware
No Drawing. Continuation of application Ser. No. 94,968, Mar. 13, 1961. This application Aug. 21, 1967, Ser. No. 662,191
Int. Cl. D06m 13/00, 15/00
U.S. Cl. 106—2                    20 Claims

ABSTRACT OF THE DISCLOSURE

A composition for providing durable water repellency and soil resistance to a fibrous material selected from textiles, leather and paper, said composition comprising a perfluoro aliphatic compound, a wax, an aluminum or zirconium salt and a vehicle for carrying said perfluoro compound, wax and salt into said fibrous material, and fibrous materials treated with said composition.

---

This application is a continuation of application Ser. No. 94,968, filed Mar. 13, 1961, and now abandoned.

This invention relates to novel chemical compositions, the treatment of fibrous substances therewith and the fibrous substances so treated. More particularly, this invention is directed to novel compositions for use in treating fibrous substances to impart durable water repellency and soil resistance thereto.

For many years, textiles, leather and paper have been treated with water repellents. Such water repellent compounds served to improve the hydrophobic character of textiles to protect the wearer from rain and other weather discomforts, and such water repellent finishes served to improve the resistance of the treated substrate toward water-borne stains. Of the commercially available water repellents, there are two major performance classifications; one class of water repellents is commonly designated "durable types," and the other class is commonly designated "non-durable types."

The so-called "durable type" water repellents are usually of such chemical nature that they can be polymerized to form insoluble resins, or they can be reacted with the textile substrate so as to yield results which persist through laundering and/or dry cleaning. Examples of such durable type water repellents are those based on octadecyl isocyanate, quaternary ammonium derivatives of chloromethylated fatty alcohols, quaternary ammonium derivatives of chloromethylated fatty amides, quaternary ammonium derivatives of chloromethylated fatty acids, stearamide dispersions in thermosetting resins, methylol stearamide dispersions in thermosetting resins, methylene bis stearamide dispersions in thermosetting resins, mono or dimethylol derivatives of octadecyl melamine, emulsions of methyl hydrogen polysiloxane polymers, etc. This list of durable type water repellents is not complete, but illustrates the variety of chemical types which are available to produce substantially durable water repellent effects on textiles.

As compared to this, the so-called "non-durable" water repellents comprise a variety of emulsions of waxes containing certain polyvalent metal salts. The two essential components of such non-durable types are a wax or wax mixture, e.g., a natural wax, such as, paraffin, microcrystalline waxes, vegetable waxes, halogenated paraffin and the like, and a polyvalent metal salt, e.g., aluminum and zirconium salts. Additionally, such non-durable water repellents may contain emulsifiers, colloid stabilizing agents, de-foaming agents, a solvent (such as water or mineral spirits), perfume, etc.

It has been previously known that highly fluorinated organic compounds when applied to textiles imparted a certain degree of improvement in oil-borne stain resistance. As the commercial exploitation of the fluorochemical stain resistant finishes was broadened, it became increasingly evident that the use of such chemicals had certain serious shortcomings. First of all, their extremely high cost limited their potential usefulness to only certain specialty lines of textiles. Secondly, when such products were applied in reduced concentrations to minimize the cost of such treatments, the oil and soil resistance, as well as the water resistance, fell below acceptable levels. Finally, these fluorochemical finishes have poor resistance to mechanical abuse such as abrasion and flexing and have relatively poor resistance toward washing and dry cleaning.

Several years ago, it was discovered that the properties of fluorochemical finishes could be upgraded, and the cost of the finish reduced slightly by the application of the fluorochemical and one or more of the so-called durable water repellent compounds. It has been common practice in the last year or two to apply fluorochemicals and durable water repellents to fabrics for the reasons stated.

The application of fluorochemicals to textiles initially provides some water repellency which does not endure laundering or dry cleaning. The application of the non-durable water repellents to textile fabrics preceded by, or followed by, the treatment with a fluorochemical provides a high initial water repellency which does not endure laundering and/or dry cleaning. It has been found, however, that, when the non-durable water repellent is combined with the fluorochemical to form a compatible mixture, novel compositions are obtained which, when applied to textile fabrics, provide remarkably durable water repellency and resistance to launderings and dry cleanings. Fabrics treated with the novel compositions, furthermore, are more resistant to oil-borne stains and water-borne stains and such properties are more enduring and resistant to mechanical abuse (e.g. abrasion and flexing), laundering and/or dry cleaning, than fabrics treated with any fluorochemical or fabrics treated with most combinations of durable water repellents and fluorochemicals. In short, the water repellency and soil repellency of the so-called non-durable water repellents becomes durable and that of the fluorochemical is improved and becomes durable when the two are combined in a single composition. Furthermore, because of the ready availability of non-durable water repellents as compared to the limited availability of durable water repellents, the novel compositions too are readily available at lower costs.

The novel compositions of this invention comprises a mixture of a non-durable water repellent and a fluorochemical and can be in the form of water emulsions or non-aqueous solutions, depending on whether or not its intended use is on water-sensitive textiles. These compositions are applied to textiles leather or paper in any suitable manner, e.g., by padding, followed by heating the impregnated textile to an elevated temperature and for a commensurate time to dry and cure the impreg-
::::

nated textile without decomposing it. The novel compositions and treatments are applicable to textiles made of natural and/or synthetic fibers, e.g., cotton, wool, nylon, silk, cellulose acetate, and the like.

The fluorochemical soil-proofing materials which are suitable for use in this invention are well known in the art and include the aliphatic compounds, including polymers, in which the carbon-bonded hydrogen atoms are replaced to the extent of at least 50% with fluorine atoms. Such fluorine-substituted organic compounds are generally designated as "perfluoro" compounds. As examples of such perfluoro-chemicals are perfluoro butyric acid ($C_3F_7COOH$), perfluoro octanoic acid ($C_7F_{15}COOH$), the chromium co-ordination complex of perfluoro octanoic acid, trifluoro acetyl chloride, the polymer of vinyl perfluorobutyrate, the polymer of perfluorobutyl acrylate, the copolymer of vinyl perfluorobutyrate and perfluorobutyl acrylate, the polyester obtained by the interaction of trifluoroacetyl chloride and polyvinyl alcohol, the polymer obtained from alpha-trifluoromethyl acrylonitrile, etc. The polymers listed can be in the form of aqueous lactices, or they can be solvent solutions in appropriate organic solvents in which they are soluble. Some commercially available perfluorochemicals which are suitable in this invention are the products manufactured by Minnesota Mining and Manufacturing Company under the trade name designations "Scotchgard FC–154" and "Scotchgard FC–208." FC–154 is a chromium co-ordination complex of perfluoro octanoic acid and FC–208 is a polymer or copolymer of perfluoroacrylic or methacrylic ester, for example as described in U.S. Patent No. 2,803,615.

The respective proportions of fluorochemical and non-durable water repellent in the compositions are not narrowly critical and can be widely varied to produce the desired results. Advantageous amounts of fluorochemical are from 0.1 to 5 percent by weight and advantageous amounts of non-durable water repellent are from 0.1 to 4 weight percent of wax and 0.01 to 1 weight percent of the polyvalent metal oxide salt, the percentages being based on the total weight of the novel composition.

Compositions A through F illustrate various types of non-durable water repellent materials which can be used in this invention. These compositions are not to be considered limiting but merely illustrative of the types of materials contemplated.

(A)

4 parts of gum rosin are added to 60 parts of water containing 0.5 part of caustic potash. The mixture is heated to 75° C. and stirred until all of the rosin has been saponified. While maintaining this rosin solution at 75° C., 20 parts of refined molten paraffin wax having a melting point of 65° C. is added while stirring vigorously. After all of the paraffin has been added, the mixture is stirred for an additional 30 minutes, and then it is homogenized. The homogenized emulsion is run directly into an aqueous solution containing 25 parts of water plus 10 parts of aluminum triacetate; the aluminum acetate solution is maintained at approximately 75° C. during the addition of the homogenized wax emulsion. As the wax emulsion enters the aluminum acetate solution, there is a certain amount of coagulation, but after the mixture is stirred for 5 to 10 minutes, while maintaining at 75° C., the emulsion thins down and becomes smoother. Thereafter, the complete emulsion is again homogenized, and the finished emulsion is a fluid, milk-like product in appearance and has finely dispersed paraffin wax. The emulsion may be diluted further as required for application to textiles, leather or paper.

(B)

Freshly precipitated zirconium hydroxide is dispersed in water; 10 parts of zirconium hydroxide in 60 parts of water. The dispersion is heated to 80° C., and a mixture of 25 parts of high melting refined paraffin wax plus 5 parts of candelilla wax which have previously been melted are then added in a thin stream to the zirconium hydroxide dispersion while agitating vigorously. After all of the molten wax has been added, the mixture is stirred vigorously for an additional hour, and then the emulsion is passed through a high pressure, jet type homogenizer at 5000 pounds per square inch pressure. The resulting emulsion is a fluid, milk-like product having finely dispersed wax phase. After cooling, the product is stable to storage, and may be diluted further as required for application to textiles, leather or paper.

(C)

An emulsifier is prepared by reacting one mol of stearic acid with one mole of N,N-diethylethanolamine; the reaction is conducted by heating the two ingredients to approximately 160° C. until one mol of water is evolved, resulting in the stearic ester of N,N-diethylethanolamine. Two parts of this ester are dissolved in 20 parts of high melting refined paraffin wax plus 2 parts of carnauba wax. The mixture of waxes and ester are heated to 85° C., and stirred until homogeneous. An aqueous solution is prepared in which 50 parts of water are first heated to 80° C., and to the hot water are added 20 parts of commercial zirconium acetate solution containing 13% $ZrO_2$. To the hot zirconium acetate solution, the molten wax-ester combination is then added in a thin stream while stirring vigorously. After all of the wax phase has been added, the mixture is stirred for 10 minutes, and then is homogenized through a jet type homogenizer at 3,000 pounds pressure. The resulting homogenized emulsion is then cooled to room temperature, at which point it is a fluid, milk-like product which may be diluted further as required by the addition of water.

(D–1)

An emulsifier is prepared by placing 100 parts of hydrogenated sardine oil in a vessel which is equipped with a heavy duty stirrer and a jacket in which steam can be injected for heating. The hydrogenated fish oil is heated to approximately 95–100° C., and then approximately 20 parts of 45% caustic potash is added gradually while continuing to heat and to stir. After all of the caustic potash has been added, the mixture is stirred and heated until the hydrogenated fish oil is substantially saponified. While continuing to heat and to stir, 20 parts of diethyleneglycol and 20 parts of tallow fatty acids are added and the mixture stirred further. Ten parts of candelilla wax are also added, and the mixture stirred until it is homogeneous. The resulting product is tan paste-like material which can be used as an emulsifier for paraffin as now shown. 10 parts of this emulsifier are mixed with 40 parts of crude scale paraffin wax, and the mixture heated to 90° C. and stirred until the entire mixture is crystal clear. While continuing to maintain this molten mixture at 80–90° C., add 50 parts of water which has previously been heated to 80° C. The water is added slowly while stirring the molten wax mixture. As the water is added, the mixture gradually becomes thicker and thicker until approximately 25% of the water has been added. Thereafter, on the addition of further water, the mixture starts to thin down again and becomes milky, indicating an inversion of phases. After all of the water has been added, and the mixture cooled to room temperature, the resulting product is a milky fluid emulsion which may be further diluted as required.

(D–2)

An aqueous salt solution of polyvalent metal salts is prepared by dissolving 5 parts of commercial zirconium acetate solution (containing 13% $ZrO_2$) with 5 parts of commercial aluminum acetate powder which is sold under the commercial designation "Niaproof," and which comprises a basic aluminum acetate of approximately 35% Al$_2$O$_3$ content and which contains a small amount of boric acid as a storage stabilizer, in approximately 90 parts of water.

(E)

A solution is prepared in which 4 parts of hide glue is soaked in 65 parts of cold water which contains 1 part of dibutyl sodium naphthylene sulfonate. After the glue has been swollen in this solution at room temperature, the mixture is then heated to 80° C. To this aqueous glue solution is then added 25 parts of refined paraffin wax having an AMP melting point of 133/135° F. While the wax is being added, the mixture is stirred vigorously. After all of the wax has been added, the mixture is stirred for an additional 20 minutes, and then is passed through a colloid mill which comprises a rotating cone in very close position to a stationary cone; the emulsion is passed through the narrow space between these cones, resulting in a high shearing action and in a fine emulsion. After cooling, the resulting product becomes a jelly-like, white emulsion which may be further diluted by dissolving in hot water in which some aluminum formate has previously been dissolved.

(F)

Five parts of aluminum monostearate, 20 parts of high melting refined paraffin wax, and 10 parts of high melting microcrystalline wax are mixed with 60 parts of mineral spirits. The entire mixture is heated to approximately 90° C., and it is stirred until completely homogeneous. The mixture is then stirred while cooling to 60° C., and then it is run into drums. On cooling to room temperature, the resulting product is a salve-like paste which may be further diluted by mixing with additional mineral spirits or other organic solvent such as 1,1,1-trichloroethane.

The following examples are presented. All parts and percentages are by weight unless otherwise indicated. In all examples, the fabrics were impregnated with the novel compositions to provide 70% wet pick-up and then dried and cured. The drying and curing of impregnated cotton, nylon and cellulose acetate fabrics were at about 320° F. for 4 to 6 minutes and the drying and curing of the impregnated wool and silk fabrics were at 220 to 250° F. for 4 to 6 minutes, but these curing conditions are not critical.

EXAMPLE 1

10 parts of composition A plus 3 parts of perfluoro octanoic acid are dissolved in 87 parts of water. Fabrics composed of cellulose acetate yarn are impregnated with this solution, and then dried and cured. The resulting treated fabrics have significantly better water resistance, and oily soil resistance than when the perfluoro octanoic acid is applied by itself or when the perfluoro octanoic acid and composition A are applied separately in any sequence.

EXAMPLE 2

4 parts of the chromium co-ordination complex of perfluoro octanoic acid are dissolved in 86 parts of water, and to this is added 10 parts of composition B. Wool fabric is impregnated with this solution, dried and cured, and it is found that the resulting treatment shows much superior resistance to oil-borne stains, water-borne stains, and the finish is more persistent to washing and dry cleaning than when the perfluoro co-ordination complex is applied by itself or when the perfluoro co-ordination complex and composition B are applied separately in any sequence. If this treatment is applied to leather (for example, garment suede), the treated leather shows excellent resistance to oil and water-borne stains.

EXAMPLE 3

The product obtained by esterification of polyvinyl alcohol with trifluoro acetic acid is dispersed with a small amount of nonionic dispersing agent so as to provide 4 parts of this perfluoro vinyl acetate in 86 parts of water. To this is added 6 parts of composition C above. When applied to nylon and dried and cured, the resulting treated fabric has good resistance to water, to mineral oil and these properties are superior to those obtained when the polytrifluoro vinyl acetate is applied by itself or when it and composition C are applied separately in any sequence to the same fabric. Similar superior results are obtained when any one of the following polymers is substituted in place of the polytrifluoro vinyl acetate in about the same amounts: polymerized vinyl perfluorobutyrate, polymerized perfluorobutyl acrylate and copolymers of vinyl perfluorobutyrate and perfluorobutyl acrylate.

EXAMPLE 4

70 parts of water are heated to 85° C. and 5 parts of the emulsion of composition D–1 are added. Without delay, 5 parts of the salt solution of composition D–2 are then added quickly. After stirring briefly, 20 parts of cold water are added, and then 3 parts of a latex containing 28% of polyperfluorobutyl acrylate are then added. When cotton fabric is treated with this mixture, and dried and cured, the resulting treated cloth shows excellent resistance to oil-bore stains, water-borne stains, to resistance by raindrops, and furthermore, the resulting finish is much less affected by washing, dry cleaning, or abrasion than when the latex polyperfluorobutyl acrylate is applied by itself, or when the latex and combination of compositions D–1 and D–2 are applied separately in any sequence to the same fabric. Similar superior results are obtained when any one of the following materials are substituted in place of polyperfluorobutyl acrylate in about the same weight proportions: polymerized vinyl perfluorobutyrate and copolymerized vinyl perfluorobutyrate and profluorobutyl acrylate.

EXAMPLE 5

In approximately 50 parts of water which have been heated to 50° C., there is dissolved 5 parts of commercial aluminum formate solution (containing 15% Al$_2$O$_3$) and composition E above. After dissolving the jelly-like emulsion, an additional 25 parts of cold water are added to cool the bath. To the prediluted water-repellent emulsion is then added 3 parts of a latex containing 35% of polyvinyl perfluorobutyrate. When cotton, silk, wool or leather are impregnated with this solution, and dried and cured, the resulting treated fibrous substance is very resistant to soiling by water-borne or oil-borne stains, and resists the penetration of rain. Furthermore, the resulting trated substrate maintains these properties without substantial reduction even after washing, dry cleaning, or abrading, as for example when the treated fabric is in the form of a garment and is being worn. Similar superior results are obtained when any one of the following materials is substituted in place of the polyvinyl, perfluorobutyrate in about the same weight amounts: the chromium coordination complex of perfluoro octanoic acid, polymerized perfluorobutyl acrylate, and copolymerized perfluorobutyl acrylate and vinyl perfluorobutyrate.

EXAMPLE 6

A 50:50 copolymer of perfluorobutyl acrylate and vinyl perfluorobutyrate are dissolved in an appropriate volatile, organic solvent such as 1,1,1-trichloroethane; 3 parts of polymer are dissolved in 90 parts of solvent. To this solution is then added 7 parts of composition F above. A fabric containing water-sensitive yarns which is designed for fancy upholstery is then impregnated with this solvent solution of fluorochemical and water repellent. After drying out the solvent, the resulting treated fabric shows excellent resistance toward oily staining, water-borne staining, and the resulting finish is highly resistant to washing, dry cleaning, and abrasion, and the resistance is significantly better than when the fluorinated copolymer is applied by itself or when it and composition F are applied separately in any sequence to the same fabric. If this same treatment is applied to paper, it produces highly water and oil resistant effects. Similar superior results are obtained when any one of the following materials is substituted in place of the perfluorobutyl acrylate-vinyl perfluorobutyrate copolymer in about the same weight proportions: polymerized vinyl perfluorobutyrate and polymerized perfluorobutyl acrylate.

In the application of these materials to textiles, other materials can also be included in the treating bath simultaneously. For example, when treating cellulosic fabrics, it is contemplated that thermosetting resins to impart shrinkage control and/or crease resistance could also be included. Examples of such thermosetting resins would be urea-formaldehyde condensates, melamine-formaldehyde condensates, dimethylolethylene-urea products, dimethylol triazone compounds, diepoxide compounds, etc. In the event that such thermosetting resins are included in the treatment, it would be expected and customary to also include an appropriate acid reacting catalyst which would accelerate the curing of such thermosetting materials or would accelerate the reaction of the agent with the cellulose. Examples of such catalysts would be ammonium chloride, the hydrochloride salt of 2-amino-2-methyl-1-propanol, zinc nitrate, maleic acid, magnesium chloride, zinc fluoroborate, etc. The major consideration in the selection of an appropriate catalyst is one of compatibility with the other ingredients in the same treating bath, and also a material of sufficient activity to properly accelerate the curing of the thermosetting material.

In those cases where thermosetting resins are incorporated in the same treatment, the treated fabric can also be dried partially, and then the impregnated partially dried fabric be subjected to mechanical deformation, as for example, by passing through a glazing calender or through an embossing calender, or through a Schreiner calender, and then after the mechanical deformation of the fabric has been completed, that the fabric then be cured so as to fix the resin with the fabric in the deformed condition so as to make such deformation permanent to washing and/or dry cleaning.

Although this invention does not include the exclusive use of durable type water repellents in combination with fluorochemical treating agents, some circumstances may exist where a combination of fluorochemical with non-durable water repellent may be benefited by the addition of small quantities of so-called durable water repellents. In such cases, however, the durable water repellents would be used as a minor constituent, and the solids deposited from such durable water repellents would be present to a lesser extent than the solids deposited from the non-durable water repellents.

Depending upon the particular chemical composition of the fluorochemical involved and the non-durable water repellent used, there may or may not be satisfactory compatibility of the two constituents in concentrated form. There are certain combinations which are compatible only when the ingredients have been previously diluted to the extent necessary for application to fabrics; there are other combinations which are highly compatible even in the concentrated state; thus, it is within the scope of this invention to apply the fluorochemical and non-durable water repellent by maintaining the two products separately in their concentrated state, and then diluting them at the time of use, and combining them at the time of use; it is within the scope of this invention to prepare concentrated mixtures of the perfluorochemical and appropriate, compatible non-durable water repellents in a single concentrated package which may be then stored, shipped, and held until it is to be used; at which time, it would be diluted as a single product, and then applied. Thus, also included within the scope of this invention are combination products which are in relatively concentrated form which contain perfluoro constituents, dispersed or dissolved waxes, and dispersed or dissolved polyvalent metal salts (zirconium and/or aluminum).

In addition to the thermosetting resins and the catalysts for same, there may be also added to the compositions of this invention other ingredients such as stiffening agents, anti-static agents, dye fixatives, and other appropriate chemicals; the important consideration in all cases is the requirement for compatibility of the treating solution or emulsion, and compatibility of the deposited solids; it being necessary that any such additives not detract from the desired oil repellency, water repellency, or durability of these properties.

What is claimed is:

1. A composition for providing durable water repellency and soil resistance to a fibrous material selected from textiles, leather and paper, said composition comprising from 0.1 to 5% by weight of a perfluoro aliphatic compound, from 0.1 to 4% by weight of a natural wax, from 0.01 to 1% by weight of a polyvalent metal salt selected from the group consisting of aluminum acetate, aluminum formate, aluminum monosterate, zirconium acetate, zirconium hydroxide and a mixture of zirconium acetate and aluminum acetate, the balance being a vehicle for carrying said perfluoro aliphatic compound, said wax and said polyvalent metal salt into said fibrous material.

2. The composition according to claim 1 wherein the vehicle is water.

3. The composition according to claim 1 wherein the vehicle is an organic, volatile solvent.

4. The composition according to claim 1 wherein the wax is a petroleum wax and the polyvalent metal salt is a zirconium salt.

5. The composition according to claim 1 wherein the wax is a petroleum wax and the polyvalent metal salt is an aluminum salt.

6. The composition according to claim 1 wherein the wax is paraffin, the polyvalent metal salt is aluminum acetate and the perfluoro aliphatic compound is polymerized vinyl perfluorobutyrate.

7. The composition according to claim 1 wherein the wax is paraffin, the polyvalent metal salt is aluminum acetate and the perfluoro aliphatic compound is the chromium-coordination complex of perfluoro octanoic acid.

8. The composition according to claim 1 wherein the wax is paraffin, the polyvalent metal salt is aluminum acetate and the perfluoro aliphatic compound is polymerized perfluorobutyl acrylate.

9. The composition according to claim 1 wherein the wax is paraffin, the polyvalent metal salt is aluminum acetate and the perfluoro alpihatic compound is a copolymer of perfluorobutyl acrylate and vinyl perfluorobutyrate.

10. A textile fabric treated with the composition of claim 1.

11. A textile fabric treated with the composition of claim 2.

12. A textile fabric treated with the composition of claim 3.

13. A cellulose acetate yarn treated with the composition of claim 4.

14. A woolen fabric treated with the composition of claim 5.

15. A nylon fabric treated with the composition of claim 6.

16. A cotton fabric treated with the composition of claim 7.

17. A silk fabric treated with the composition of claim 8.

18. A woolen fabric treated with the composition of claim 8.

19. A leather sheet treated with the composition of claim 8.

20. A cotton fabric treated with the composition of claim 8.

References Cited
UNITED STATES PATENTS
2,635,055 4/1953 Figdor.
2,803,615 8/1957 Ahlbrecht et al.

OTHER REFERENCES
Lovelace et al.: "Aliphatic Fluorine Compounds," Reinhold Corp., N.Y., 1958, pp. 231–233.

Phillips et al.: "The Application of Fluorochemicals to Cotton Fabrics to Obtain Oil and Water Repellent Surfaces," Textile Research Journal, vol. XXVII, No. 5, May 1957.

JULIUS FROME, Primary Examiner

LORENZO HAYES, Assistant Examiner

U.S. Cl. X.R.

106—271; 117—135.5, 140, 142, 144, 155; 252—8.6; 260—28.5, 29.6